United States Patent
Lee et al.

(10) Patent No.: US 8,585,807 B2
(45) Date of Patent: Nov. 19, 2013

(54) LOW-COST METHOD FOR FABRICATING PALLADIUM AND PALLADIUM-ALLOY THIN FILMS ON POROUS SUPPORTS

(75) Inventors: Tae H. Lee, Naperville, IL (US); Chan Young Park, Naperville, IL (US); Yunxiang Lu, Tonawanda, NY (US); Stephen E. Dorris, La Grange Park, IL (US); Uthamalingham Balachandran, Willowbrook, IL (US)

(73) Assignee: UChicago Argonne, LLC, Chicago, IL (US)

( * ) Notice: Subject to any disclaimer, the term of this patent is extended or adjusted under 35 U.S.C. 154(b) by 132 days.

(21) Appl. No.: 13/250,980

(22) Filed: Sep. 30, 2011

(65) Prior Publication Data
US 2013/0081540 A1  Apr. 4, 2013

(51) Int. Cl.
*B01D 53/22* (2006.01)

(52) U.S. Cl.
USPC ................ 96/12; 95/45; 95/55; 96/4; 96/11

(58) Field of Classification Search
USPC .................... 95/45, 55; 96/4, 11, 12
See application file for complete search history.

(56) References Cited

U.S. PATENT DOCUMENTS

| | | | | |
|---|---|---|---|---|
| 2,251,454 A * | 8/1941 | Jeffery | ........................ | 264/603 |
| 3,201,223 A * | 8/1965 | Bohuslav et al. | ............... | 75/370 |
| 3,455,705 A * | 7/1969 | Rusher | ........................ | 106/38.23 |
| 5,866,515 A * | 2/1999 | Dorris et al. | ................... | 505/230 |
| 6,358,567 B2 | 3/2002 | Pham et al. | | |
| 6,569,226 B1 * | 5/2003 | Dorris et al. | ........................ | 95/56 |
| 7,604,771 B2 | 10/2009 | Song et al. | | |
| 7,959,716 B2 * | 6/2011 | Song et al. | ........................ | 96/11 |
| 2007/0044662 A1 | 3/2007 | Song et al. | | |
| 2007/0044663 A1 * | 3/2007 | Song et al. | ........................ | 96/11 |
| 2007/0270301 A1 * | 11/2007 | Song et al. | ........................ | 501/80 |
| 2008/0277630 A1 * | 11/2008 | Kiyoshima et al. | ........... | 252/514 |

FOREIGN PATENT DOCUMENTS

DE  102008060708 A1 * 6/2010
EP  0342048 A2 * 12/1989
WO  WO92/09848   * 6/1992

\* cited by examiner

*Primary Examiner* — Jason M Greene
*Assistant Examiner* — Anthony Shumate
(74) *Attorney, Agent, or Firm* — Cherskov Flaynik & Gurda, LLC (57) ABSTRACT

A process for forming a palladium or palladium alloy membrane on a ceramic surface by forming a pre-colloid mixture comprising a powder palladium source, carrier fluid, dispersant and a pore former and a binder. Ultrasonically agitating the precolloid mixture and applying to a substrate with an ultrasonic nozzle and heat curing the coating form a palladium-based membrane.

20 Claims, 6 Drawing Sheets

Colloidal Spray Deposition process

Figure 1  Colloidal Spray Deposition process

Figure 2a. Surface of the YSZ substrate before sintering

Figure 2b Surface of the YSZ substrate after sintering

Figures 3a and 3b
Pd film thickness can be controlled by changing the duration of colloid spraying Figure 4a Pd film (≈7μm) on a porous YSZ substrate Figure 4b Pd film (≈ 10μm) on a porous YSZ substrate Figure 5
SEM micrograph of the film surface shows that the Pd film is dense.

Figure 6
XRD pattern of the film surface shows only pure Pd phase.

Figure 7 Temperature dependence of $H_2$ permeation flux through ~7 μm thick Pd film (Feed gas: 90% $H_2$ balance He).

LOW-COST METHOD FOR FABRICATING PALLADIUM AND PALLADIUM-ALLOY THIN FILMS ON POROUS SUPPORTS

CONTRACTUAL ORIGIN OF THE INVENTION

The U.S. Government has rights in this invention pursuant to Contract No. DE-AC02-06CH11357 between the U.S. Department of Energy and UChicago Argonne, LLC.

BACKGROUND OF THE INVENTION

1. Field of the Invention

The present invention relates the fabrication of palladium and palladium-alloy thin films on porous supports for use in separation processes and more specifically, the present invention relates to low-cost processes for forming a thin film.

2. Background of the Invention

Concerns of global climate change are driving nations to develop electric power generation technologies and transportation technologies which reduce carbon dioxide emissions.

Hydrogen is considered the fuel of choice for both the electric power and transportation industries. While it is likely that renewable energy sources will ultimately be used to generate hydrogen, fossil-based technologies will be utilized to generate hydrogen in the near future.

A variety of metallic, ceramic and polymer membranes have been used for $H_2$ separation from gas streams. The most common metallic membrane materials are palladium (Pd) and palladium alloys. Palladium (Pd) metal is a well-known hydrogen transport material that can be used as a hydrogen separation membrane for various applications such as coal gasification.

Hydrogen permeation flux through Pd is limited by the diffusion through bulk. To achieve high hydrogen flux and to reduce diffusion resistance through the membrane, Pd membrane should be in the form of a thin film, preferably less than 10 microns (<10 μm). In addition, Pd is expensive; therefore, reducing the Pd thickness reduces the material cost. Further, since hydrogen transport materials are subjected to a driving force of pressure to increase diffusion, thin, mechanically weak, layers of hydrogen transport material must be supported on a porous support or substrate, typically a ceramic or metal. Due to metals reactivity with palladium, ceramic supports are preferred for supports for palladium film. The porous substrate can also limit hydrogen diffusion if its pores are very small (nanometer size). In order to reduce the diffusion resistance through the membrane, the membrane should be made as thin as possible so as to provide the shortest path of diffusion for the hydrogen through the membrane.

There are a number of thin-film fabrication techniques, such as, sputtering, chemical vapor deposition, and electroless plating, that can produce Pd thin films. However, these processes tend to be slow and the yield for Pd film is extremely small. Sputtering is a slow process that requires several hours to form a thin film of 1 to 2 μm. The sputtering process is performed under a high vacuum, which requires additional processing time to achieve a high vacuum prior to sputtering. Further, sputtering utilizes relatively expensive specialized equipment. Chemical vapor deposition (CVD) often requires the use of toxic and expensive metal organic chemicals to form a thin membrane. Depending on the type of CVD process (e.g., low pressure, Ultrahigh vacuum CVD, plasma methods, atomic layer CVD, combustion, and hot wire CVD), special process conditions may be required. These special conditions increase the cost of the process and the time required for fabrication. (For example, the electroless plating requires toxic chemicals.) Typically, with any of the palladium deposition methods discussed herein, a significant percentage of the palladium is not applied to the substrate surface, i.e., low utilization yield. Further, all of the existing Pd thin-film fabrication techniques require the substrate to contain very small pores in order to avoid the formation of pinholes in the Pd thin film. Pinholes must be avoided, because they degrade the membrane's selectivity for hydrogen. The small pores on a substrate, however, result in increasing the resistance of gas phase hydrogen diffusion through the substrate. It is preferable to provide larger pores within the substrate to reduce resistance to hydrogen gas flow. The membrane/support system should be configured in a manner that the membrane controls the flow of hydrogen gas through the membrane/support system.

Composite hydrogen transport membranes are used to separate hydrogen from a hydrogen containing feed for a variety of industrial processes. Such membranes can consist of a hydrogen transport material supported by a porous support. It is believed that such membranes function by diffusing hydrogen to a surface of the membrane and then disassociating the hydrogen molecules to hydrogen atoms. The hydrogen atoms are transported through the membrane and at the opposite surface of the membrane, the hydrogen molecules recombine from the hydrogen atoms. Hydrogen molecules then diffuse away from the opposite surface of the membrane.

Such hydrogen transport membranes are fabricated from palladium or alloys of palladium containing silver and function at high temperatures under the driving force of pressure. The flux of the hydrogen developed through the membrane is in part dependent upon the diffusion resistance of the membrane, the pressure applied, and the temperature to which the membrane is subjected.

Additional precautions must be taken when handling fine metal powders, in particular palladium powders. Fine metal powders tend to be reactive when exposed to air or oxygen. The exothermic reaction of oxygen with the metal generates heat. When organic compounds, in particular organic solvents, are used in the processing of metal powders, the danger of fire or explosions is increased. This is particularly important in the processing of powdered palladium, as palladium has a strong affinity for oxygen.

A need exists in the art for a palladium deposition process to rapidly produce Pd thin films on a large surface area of porous substrates that contain large (micrometer size) pores on their surface. The palladium thin film forming process should utilize relatively benign chemicals to rapidly form the thin film with low cost equipment operated at temperatures and pressures close to ambient.

SUMMARY OF INVENTION

An object of the invention is to provide a membrane fabrication method that overcomes many of the disadvantages of the prior art deposition methods.

Another object of the present invention is to provide a method that utilizes environmentally friendly chemical processing agents. A feature of the invention is a method that uses water or water soluble process chemicals that do not present an environmental hazard. An advantage of the invention is that process waste can be handled without the need for special environmental protection or containment.

Another object of the present invention is to provide a method that deposits a high percentage of the palladium on the substrate. A feature of the invention is reduced waste of expensive palladium-based process chemicals. An advantage of the invention is to provide a low cost deposition process by achieving a high utilization rate of chemical agents.

Another object of the present invention is to provide a method that can be operated at close to ambient temperatures and pressures. A feature of the invention is the reduction in the need for process equipment requiring special process conditions. An advantage of the invention is a method that can proceed with minimal time to bring environmental conditions within a specific range.

Another object of the present invention is to provide a method that uses a stable colloid which remains suspended without settling for an extended period. A feature of the invention is a stable colloid in which the particles remain suspended without mixing and can be stored for more than one hour. An advantage of the invention is a method that uses a colloid that does not require constant agitation, thereby reducing energy input to maintain the colloid.

The invention is directed to a low cost method for rapidly fabricating a dense, thin film of Pd or Pd-alloy thin film on a porous support with micrometer-size pores. The key to the invention is making a colloidal solution of palladium metal powder in carrier liquid, preferably deionized water with a surfactant. The unique combination of an organic coated palladium powder, liquid and dispersant produces a colloid that is stable for an extended period of time. This unique colloid provides improved coverage over a porous substrate. The solution is sprayed on to a porous substrate made of yttrium-stabilized zirconia (YSZ) or SrFeCu0.5 Ox (SFC2), pore formers, and a binder. The solution is sprayed using an ultrasonic atomizing nozzle to obtain a uniform film. A dense film is obtained by sintering the green film and substrate at temperatures above 1,000° C.

Briefly, the invention is directed to a process for forming thin palladium-based film on a porous substrate. An uncured ceramic substrate having a surface is provided. A pre-colloid mixture comprising a powder palladium source, carrier fluid, and a dispersant are agitated to form a colloid mixture. The colloid mixture is pumped to an ultrasonic atomizing nozzle and applied to the surface of the substrate to form a palladium based layer having a thickness from about 1 µm to about 100 µm on the substrate. The substrate and colloid mixture are heated to form a palladium coating on the substrate. In one embodiment of the invention the uncured substrate is a mixture of a structural ceramic, such as yttrium-stabilized zirconium oxide (YSZ), a pore former, and a processing aid. In an embodiment of the invention the heating is performed at a temperature from about 1000° to about 1300° C. Preferably, the heating process is performed under an inert atmosphere. In one embodiment, the pore former is selected from the group consisting of carbon black, and poly(methyl methacrylate-co-ethylene glycol dimethacrylate). In an embodiment the structural ceramic can be selected from stabilized zirconium, yttrium stabilized zirconium (YSZ), SrFeCu0.5Ox (SFC2), alumina and other ceramics material whose thermal expansion is compatible with palladium film.

The colloid of this invention provides improved ability to coat substrates having pore diameters in the range from about 0.5 µm to about 20 µm. In an embodiment of the invention, the colloid provides a coating over a porous substrate having pore diameters in the range from about 1.0 µm to about 10 µm.

BRIEF DESCRIPTION OF DRAWING

The invention together with the above and other objects and advantages will be best understood from the following detailed description of the preferred embodiment of the invention shown in the accompanying drawings, wherein:

FIGS. 3a and 3b are photomicrographs illustrating how Pd film thickness can be controlled by changing the duration of colloid spraying.

DETAILED DESCRIPTION OF THE INVENTION

The foregoing summary, as well as the following detailed description of certain embodiments of the present invention, will be better understood when read in conjunction with the appended drawings.

As used herein, an element or step recited in the singular and preceded with the word "a" or "an" should be understood as not excluding plural said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

The invention provides a low-cost process for fabricating a thin palladium membrane onto a porous substrate with micrometer-sized pores. The invention uses a colloidal solution of Pd metal powder in non-toxic solvent, preferably deionized water with a surfactant. The solution is sprayed on to a porous substrate made of a structural ceramic, pore formers, and a binder. The solution is sprayed using an ultrasonic atomizing nozzle to obtain a uniform film. A dense film is obtained by sintering the green film and substrate at temperatures above 1,000° C. The process provides high utilization of the palladium source material (>50%), thus significantly reducing waste of expensive palladium material. In an embodiment the structural ceramic can be selected from stabilized zirconium, yttrium stabilized zirconium (YSZ), SrFeCu0.5Ox (SFC2), alumina and other ceramics material whose thermal expansion is compatible with palladium film.

Figure 1:
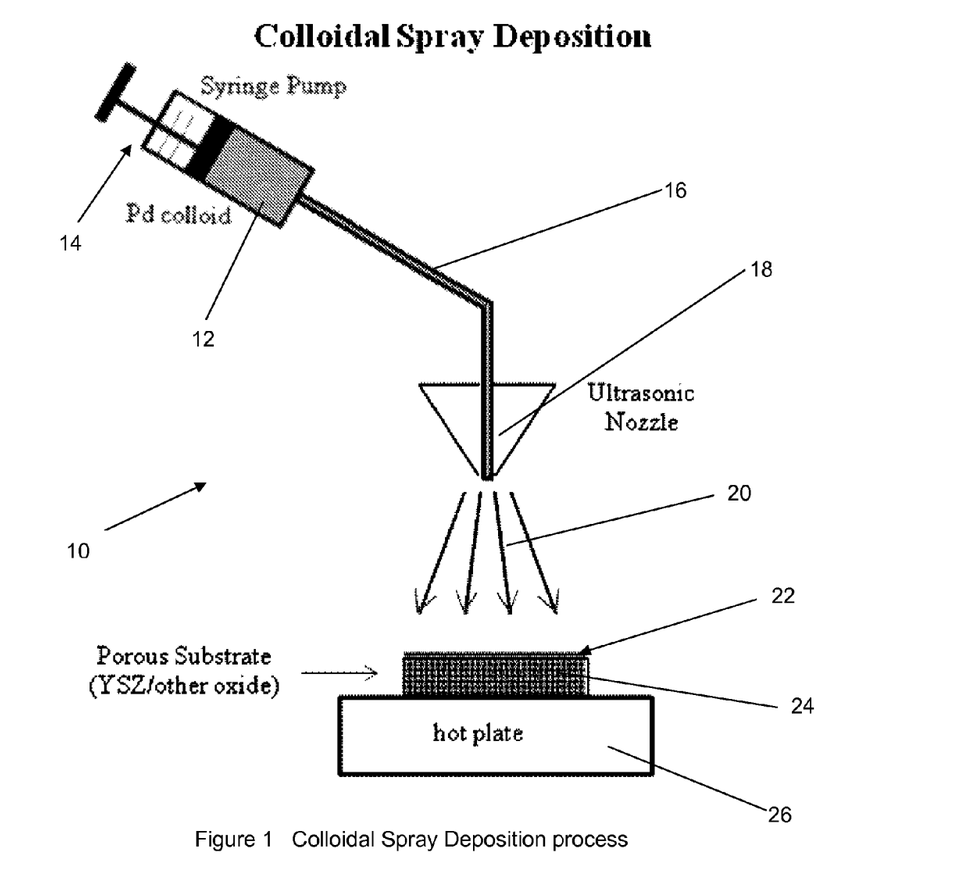
FIG. 1 is a diagram of the process.

The process of the invention begins with the preparation of an uncured ceramic substrate having a surface. The substrate for use with a palladium film is formed by mixing a structural ceramic, which have been ground and processed to the appropriate size and mixed with the appropriate pore former and sintering aids, such as iron oxide and zinc oxide. The structural ceramic can be selected from stabilized zirconium, yttrium stabilized zirconium (YSZ), SrFeCu0.5Ox (SFC2), alumina and other ceramics material whose thermal expansion is compatible with palladium film. The substrate is pressed into the appropriate shape. A colloid precursor is prepared by mixing powdered palladium metal with water and a dispersant, such as Darvan C (Vanderbilt Minerals, LLC, Murray, Ky.). Other suitable dispersants can be used. The colloid precursor is mixed or agitated by appropriate means, such as ultrasonic mixing, to form a palladium colloid mixture. The process of the invention continues as shown generally in FIG. 1 at 10. The stored colloid mixture is placed in a reservoir 12 of a pump 14. In the illustrated process, the pump is a syringe pump; however, any suitable pump such as a peristaltic pump or the like could be used. The palladium colloidal fluid is transferred through a transfer line 16 to an ultrasonic nozzle 18 and sprayed as a mist 20 onto a substrate 22 to form a palladium film 24. The substrate is supported by a heat source 26 to evaporate the water carrier and dry the film on the substrate.

The inventors have developed a palladium-based colloid that provides improved stability and storage life. The colloid of this invention remains stable from about one hour to about 72 hours after agitation is discontinued. In another embodiment of this invention, the colloid remains stable from about one hour to about 32 hours after agitation is discontinued. In another embodiment of the invention, the colloid remains stable from about 1 hour to about 24 hours. Stable is defined herein as about 80% by volume of the palladium particles remaining in suspension, which is observed by visual inspection. The improved stability of the colloid provides the means for forming a stable membrane on the surface of a porous support.

The combination of the organic coated palladium powder, liquid carrier and dispersant provides the means for forming a stable colloid. The coating of the palladium with the organic compounds, such as a fatty acid leads to improved interaction with the liquid carrier, thus providing increased colloid stability. The hydrophobic and hydrophilic nature of the fatty acid may lead to the improved interaction with the water carrier and in turn the increased colloid stability.

The process of the invention reduces hazards associated with palladiums reactivity with organic carriers by using an aqueous carrier. The aqueous based carrier significantly reduces hazards associated with ignition of carrier fluids.

EXPERIMENTAL

Preparation of Pd Colloid

One gram of palladium powder (Technic Inc., Woonsocket, R.I. 02895) was mixed with 100 ml of deionized water, and 0.2 ml of Darvan C dispersant. The average particle size of the Pd powder was 0.2 μm. The palladium powder used in the experiment was coated with saturated fatty acid. The mixture was agitated by ultrasonication for 10 minutes.

The substrate was prepared by mixing 80 g of 5 mol % $Y_2O_3$ stabilized zirconium oxide (YSZ), 15 g of carbon black as a pore former, 7 g of poly(methyl methacrylate-co-ethylene glycol dimethacrylate) as a pore former, and 9 g of a sintering aid. The mixture was ball-milled for 24 hours. The mixture was dried and sieved through a mesh size 150. The mixture was pressed into a 1" diameter disk using uniaxial press at 200 MPa and partially sinter for 10 h at 970° C. in air.

Pd Film Fabrication

The palladium colloid mixture was sprayed onto the YSZ substrate using an ultrasonic atomizing nozzle. The resulting disc was sintered for two to three hours at 1150~1200° C. under an argon atmosphere.

Figure 2A:
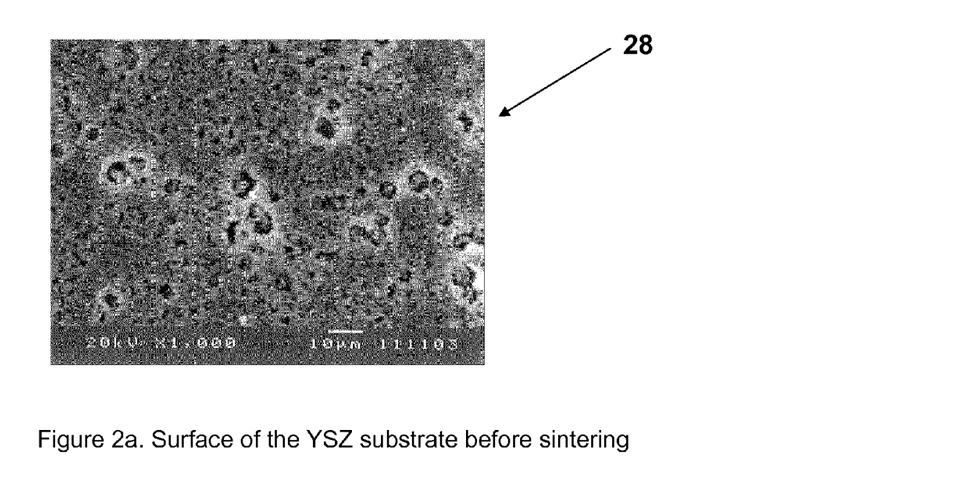
FIG. 2a is a photomicrograph of uncured YSZ substrate illustrating the porous structure.
Figure 2B:
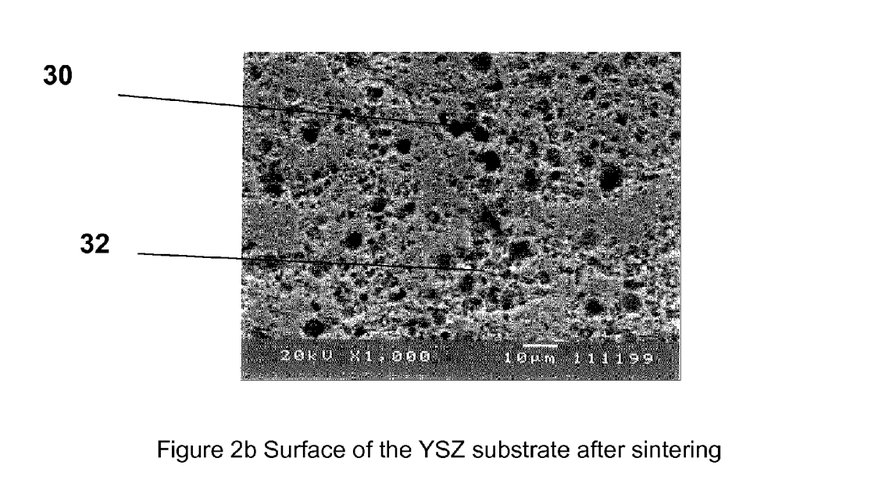
FIG. 2b is a photomicrograph of sintered YSZ substrate illustrating the porous structure.
Figure 4A:
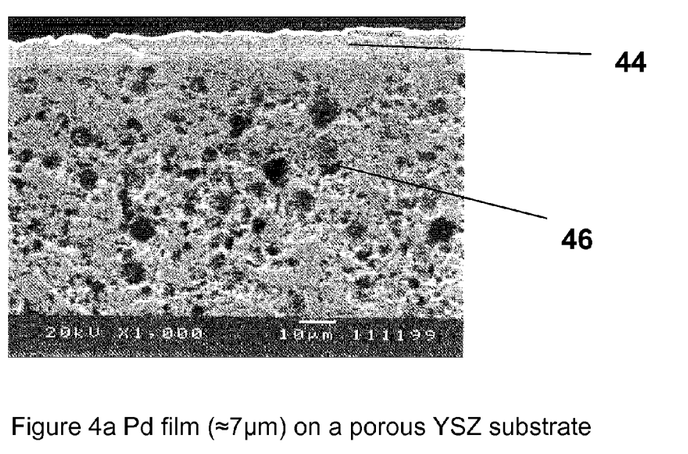
FIGS. 4a and 4b are photomicrographs illustrating how Pd film can be applied over a porous substrate.
Figure 4B:
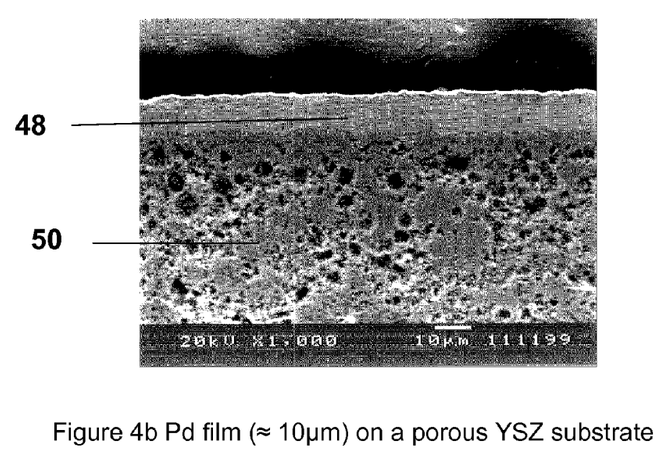
Figure 5:
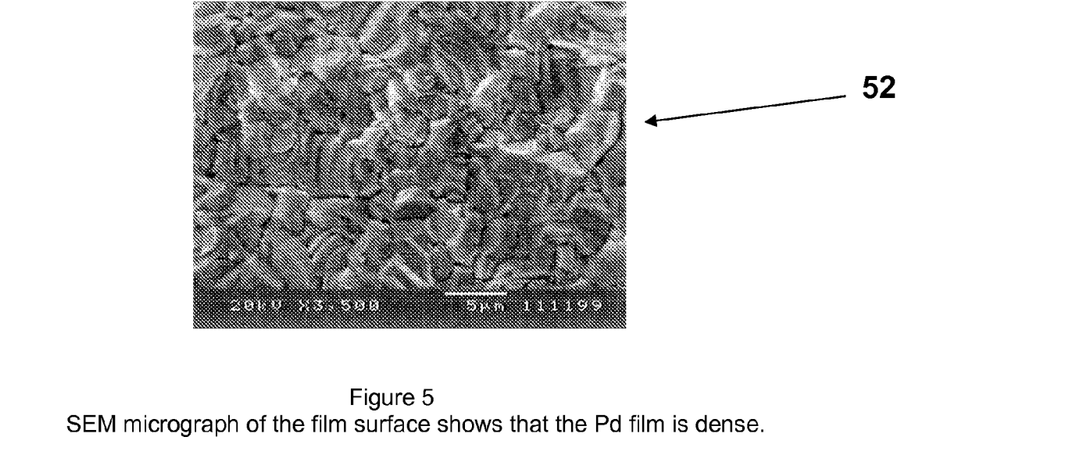
FIG. 5 is a photomicrograph of the film surface shows that the Pd film is dense.
Figure 6:
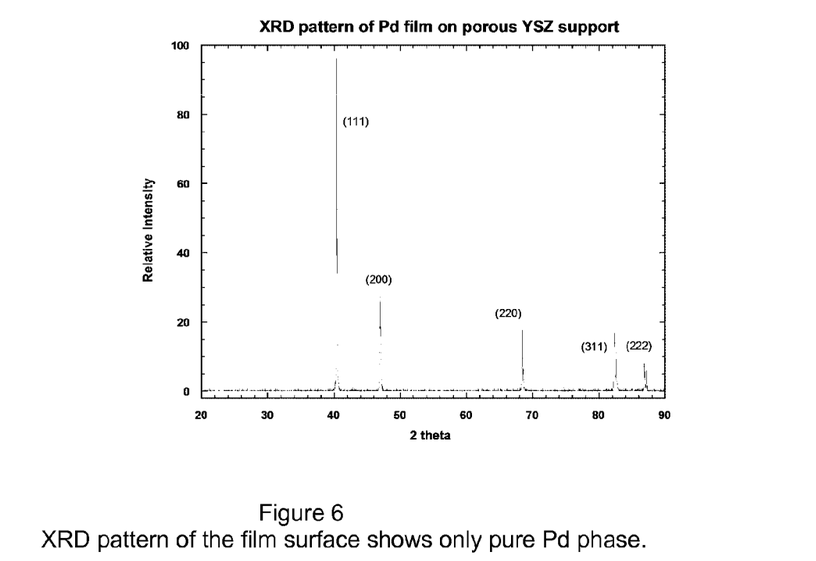
FIG. 6 is a XRD pattern of the film surface shows only pure Pd phase.
Figure 7:
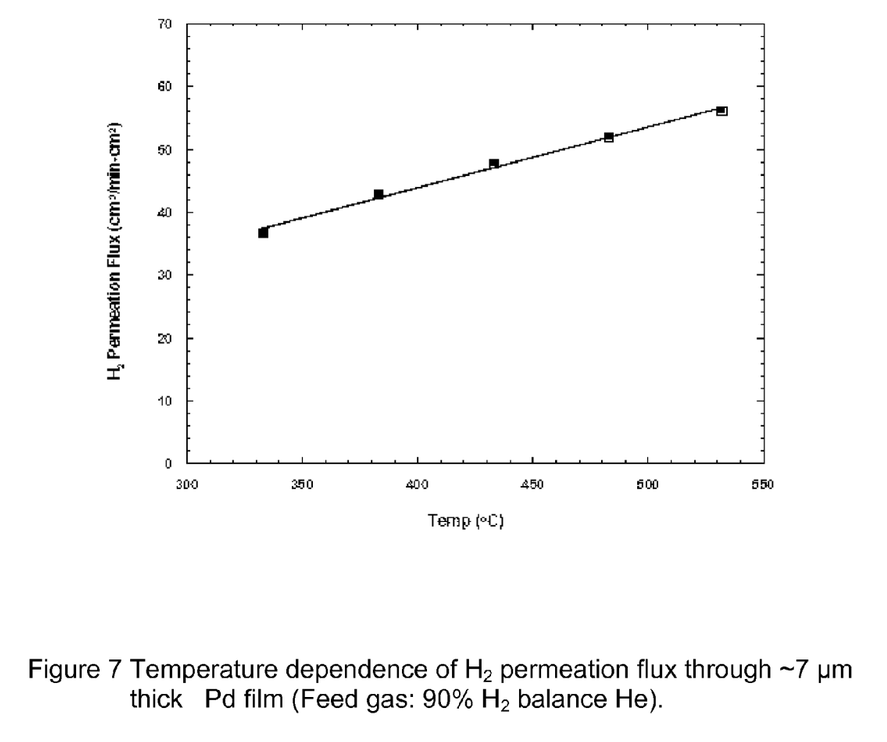
FIG. 7 is a graph illustrating temperature dependence of $H_2$ permeation flux.

The typical YSZ substrate before sintering, as show generally at 28 in FIG. 2a contains a variety of pore sizes from about 2 μm to about 10 μm. The pores after sintering, as shown in FIG. 2b, can enlarge due to shrinkage of the substrate material and grain growth. Pores as shown in FIG. 2b at 30 and 32 can range from about 4 μm to about 25 μm for larger pore groups. Coated YSZ substrate as shown in FIGS. 3a, 3b, 4a and 4b demonstrate the film forming method of the invention, forming a Pd coating over a wide range of pore sizes. In FIG. 3a coating 34 provides an approximately 5 μm film over small pores (about 1 μm to about 5 μm). In FIG. 3b, coating 38 forms an approximately 10 μm film over pores in substrate 40 from about 4 μm to about 10 μm at 42. FIGS. 4a and 4b illustrate films of approximately 7 μm and 10 μm at 44 and 48, respectively over substrates 46 and 50 containing larger pores. The process of the invention forms a dense film as shown generally at 52 in FIG. 5. As shown in XRD pattern in FIG. 6, the resulting film is pure palladium phase material. As illustrated in FIG. 7, the membrane provides high permeability to hydrogen over a wide temperature range.

The process of the invention uses a stable palladium-based colloid formed in an aqueous system to form a palladium film on a porous substrate for hydrogen separation.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

The present methods can involve any or all of the steps or conditions discussed above in various combinations, as desired. Accordingly, it will be readily apparent to the skilled artisan that in some of the disclosed methods certain steps can be deleted or additional steps performed without affecting the viability of the methods. While the invention has been particularly shown and described with reference to a preferred embodiment hereof, it will be understood by those skilled in the art that several changes in form and detail may be made without departing from the spirit and scope of the invention.

The embodiment of the invention in which an exclusive property or privilege is claimed is defined as follows:

1. A process for forming thin palladium-based dense film on a substrate comprising:
    a. providing an uncured ceramic substrate having a surface, wherein the uncured substrate is a mixture of a structural ceramic, a pore former, and a sintering aid;
    b. providing a pre-colloid mixture comprising a powdered palladium source, carrier fluid, and dispersant;
    c. agitating the pre-colloid mixture to form a colloid;
    d. pumping the colloid mixture to an ultrasonic atomizing nozzle;
    e. applying the atomized colloid to the surface of the substrate to form a palladium based layer having a thickness from about 1 μm to about 100 μm on the substrate; and f. heating the substrate and colloid mixture to form a palladium coating on the substrate.

2. The process of claim 1 where the structural ceramic is selected from the group stabilized zirconium, yttrium stabilized zirconium, SrFeCu0.5Ox and alumina.

3. The process of claim 1 wherein the heating is performed at a temperature from about 1000° to about 1300° C.

4. The process of claim 2 wherein the heating is performed under an inert atmosphere.

5. The process of claim 1 wherein the pore former is selected from the group consisting of carbon black, poly(methyl methacrylate-co-ethylene glycol dimethacrylate).

6. The process of claim 1 wherein the powdered palladium source has a particle size less than 1 µm.

7. The process of claim 5 wherein the powdered palladium source is coated with an organic layer.

8. The process of claim 7 wherein the organic layer is a fatty acid.

9. The process of claim 6 wherein the colloid is stable.

10. A hydrogen separation membrane formed on a substrate comprising
   a. providing an uncured ceramic substrate having a surface;
   b. providing a pre-colloid mixture comprising a powdered palladium source, carrier fluid, and dispersant;
   c. agitating the pre-colloid mixture to form a colloid;
   d. pumping the colloid mixture to an ultrasonic atomizing nozzle;
   e. applying the atomized colloid to the surface of the substrate to form a palladium based layer having a thickness from about 1 µm to about 100 µm on the substrate; and
   f. heating the substrate and colloid mixture to form a pure palladium coating on the substrate.

11. The hydrogen separation membrane of claim 10 wherein the uncured substrate is a mixture of structural ceramic, a pore former, and a sintering aid.

12. The hydrogen separation of claim 11 where the structural ceramic is selected from the group stabilized zirconium, yttrium stabilized zirconium, $SrFeCo_{0.5}Ox$ and alumina.

13. The hydrogen separation membrane of claim 10 wherein the heating is performed at a temperature from about 1000° to about 1300° C.

14. The hydrogen separation membrane of claim 10 wherein the heating is performed under an inert atmosphere.

15. The hydrogen separation membrane of claim 11, wherein the pore former is selected from the group consisting of carbon black, poly(methyl methacrylate-co-ethylene glycol dimethacrylate).

16. The hydrogen separation membrane of claim 10 wherein the powdered palladium source has a particle size less than 1 µm.

17. The hydrogen separation membrane of claim 10 wherein the powdered palladium source is coated with an organic layer.

18. The hydrogen separation membrane of claim 17 wherein the organic layer is a fatty acid.

19. The hydrogen separation membrane of claim 10, wherein the carrier fluid is water.

20. The hydrogen separation membrane of claim 19, wherein the water is deionized.

* * * * *

UNITED STATES PATENT AND TRADEMARK OFFICE
CERTIFICATE OF CORRECTION

PATENT NO. : 8,585,807 B2  
APPLICATION NO. : 13/250980  
DATED : November 19, 2013  
INVENTOR(S) : Lee et al.

It is certified that error appears in the above-identified patent and that said Letters Patent is hereby corrected as shown below:

In the Claims

Column 7, Line 3-5, CLAIM 2 should read:

The process of claim 1 where the structural ceramic is selected from the group stabilized zirconium, yttrim stabilized zirconium, $SrFeCo0.5Ox$ and alumina.

Signed and Sealed this
Twenty-fifth Day of February, 2014

Michelle K. Lee
*Deputy Director of the United States Patent and Trademark Office*